UNITED STATES PATENT OFFICE.

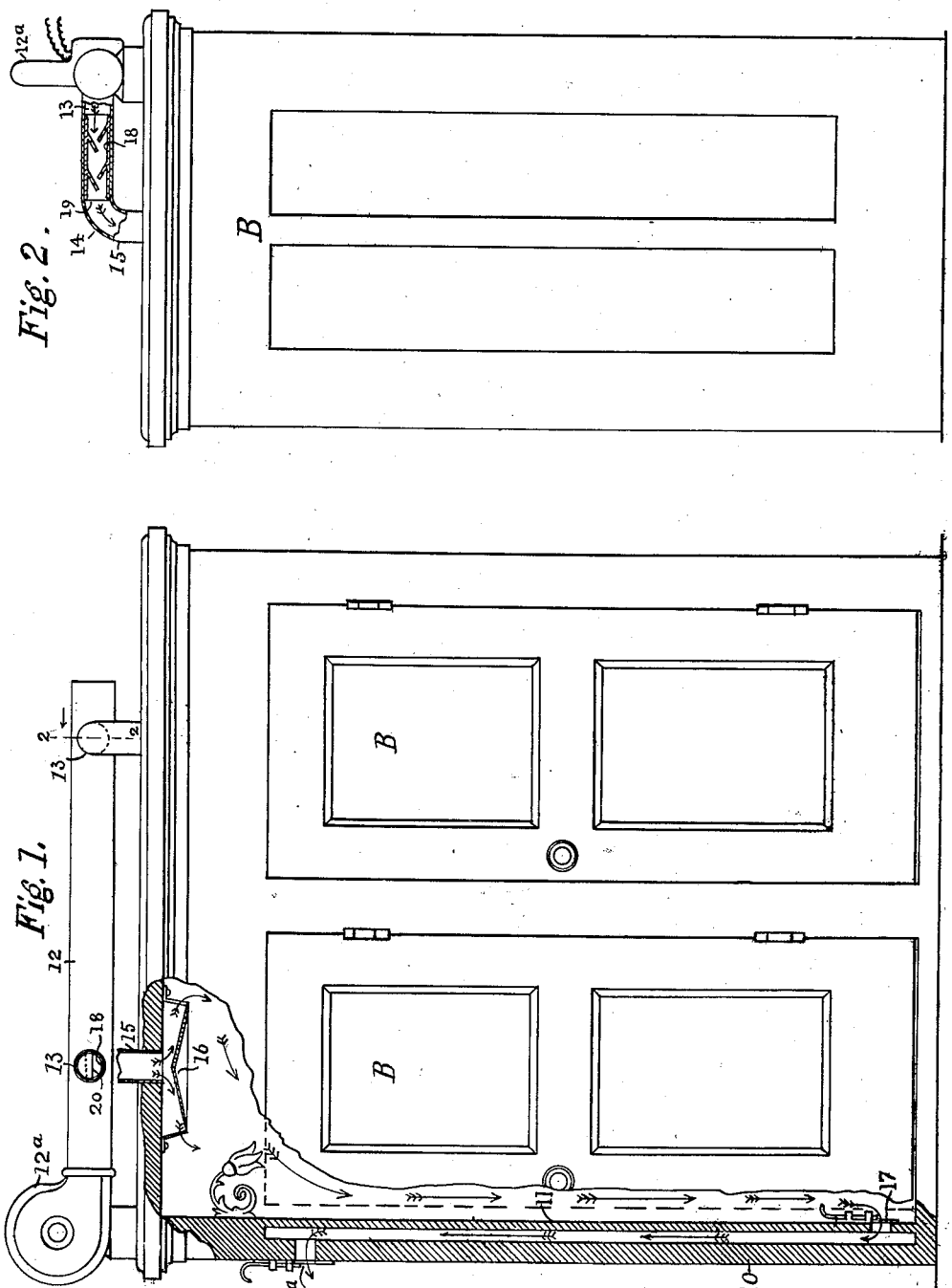

EDWIN M. SURPRISE, OF BOSTON, MASSACHUSETTS, ASSIGNOR TO AMERICAN TELEPHONE AND TELEGRAPH COMPANY, OF BOSTON, MASSACHUSETTS, A CORPORATION OF NEW YORK.

VENTILATING SYSTEM.

1,033,963.  Specification of Letters Patent.  Patented July 30, 1912.

Application filed September 12, 1910. Serial No. 581,571.

*To all whom it may concern:*

Be it known that I, EDWIN M. SURPRISE, residing at Boston, in the county of Suffolk and State of Massachusetts, have invented certain Improvements in Ventilating Systems, of which the following is a specification.

My invention relates to systems for ventilating a plurality of compartments, and is especially applicable to those used in connection with a series of telephone booths.

It has for its chief objects the provision of means for preventing the transmission of sound through the ventilating system from one booth or compartment to another, without interfering with the efficiency of such system.

In the accompanying drawings, in which the same characters of reference are applied to like parts throughout, Figure 1 shows the improved system applied to telephone booths, parts being broken away; Fig. 2 is a partial section on the line 2—2 of Fig. 1, and Fig. 3 is an enlarged sectional detail showing one of the baffle-tubes removed from the conduit.

The booths B, B are of usual construction, having outer side walls 10 and inner walls 11. Just above the booths is a horizontal main ventilating pipe or conduit 12, provided at one end with means for forcing air through it, this preferably being a fan 12ª of the pressure type. The opposite extremity of the conduit 12 is closed, and from its side extend branch conduits 13, one for each booth. In many situations it is convenient to place the main conduit at the rear of the booths; the branch conduits are therefore shown as horizontal, having an elbow 14 from which a short vertical connection 15 leads through the top of the booth. The air discharged from each branch conduit strikes a suitable deflector 16, and passing down through the booth enters the space between the double walls by means of adjustable slides 17 at the bottom of the inner wall, and escapes through a similarly controlled opening 17ª at the top of the outer wall.

Such a system as has just been described is effective in supplying fresh air to the booths, but the conduits act as channels by which the voices of the telephone users freely travel, resulting in "cross-talk," which destroys the privacy of the booths and interferes with the satisfactory use of the instruments. To prevent this, I provide means in each of the branch conduits for dissipating the sound waves. To enable the invention to be readily embodied in existing systems, I prefer to construct this sound dissipating means as a unit. Since a branch conduit of a definite sectional area has been found most efficient for the ventilation of the standard booth, and since it is customarily in the form of a cylindrical pipe, these units may be standard, and each consist of a cylindrical tube or sleeve 18, the external diameter of which is such that it will snugly fit within a conduit 13. The ends of the tubes are shown as beveled at 19 between the inner and outer walls. Each contains a series of partitions or baffle-plates 20, four being a suitable number, which project alternately from opposite sides past the axis so that the ends overlap one another. They are preferably uniformly inclined to the axis of the tube, all extending in the same direction and furnishing a tortuous passage. Both tube and partitions are of non-resonant material; the former may be of paper or indurated fiber and the latter of rubber or felt. A soft material is preferably employed for the baffles, since it is important that they shall not only be non-resonant, but also that at least their edges shall be of such a flaccid character that the passage of the air current over them is inaudible. I prefer to assemble these elements by means of slots 21 formed in the wall of the tube in the proper position, into which the partitions are cemented or otherwise secured.

One of the units is placed in each branch conduit, as clearly appears in Figs. 1 and 2 of the drawings, with the partitions inclined in the direction of the ventilating current, or diverging from the conduit walls toward the booths. The introduced air passes freely through the conduits into the booths, as indicated by the feathered arrows in Figs. 2 and 3, the partitions offering little resistance to movement in this direction. Sound waves, however, proceeding from any booth and passing the elbow 14 impinge against the baffles, and by these are reflected outwardly to the wall of the tube, where they are again reflected against the baffles and finally encounter the succeeding waves. This action is shown by the plain arrows in Fig. 3. By the reflections and by mutual interference the energy of the waves is dissipated and practically no sound reaches the main conduit; there is consequently no cross-talk transmitted through the system. The non-resonant material of the tube and baffles absorbs and prevents the direct transmission of sound through the tube, and the soft edges of the partitions are free from vibration under the influence of the ventilating current and produce no whistling sound. The tapered ends 19 of the tubes 18 act to the same end, avoiding the sound which would result from angular projections, and these features, together with the absence of moving elements in the conduits, prevent the introduction of all objectionable noise.

Having thus described my invention, I claim:

1. A sound dissipating device comprising a tube having its ends tapered between the inner and outer walls, and partitions extending across the tube, both the tube and partitions being of non-resonant material.

2. A sound dissipating device comprising a tube the wall of which is continuous and provided with slots, and baffle-plates secured in the slots.

3. Sound dissipating means for a ventilating conduit consisting of baffle-plates projecting partly across the conduit and having flaccid edges over which the air current passes.

In testimony whereof, I have signed my name to this specification in the presence of two subscribing witnesses, this ninth day of September 1910.

EDWIN M. SURPRISE.

Witnesses:
JOSEPH A. GATELY,
FRANK C. LOCKWOOD.